United States Patent
Persson

(10) Patent No.: US 8,215,674 B2
(45) Date of Patent: Jul. 10, 2012

(54) VEHICLE STRUCTURE ARRANGEMENT PROVIDED WITH PRESSURIZABLE REINFORCEMENT ELEMENT

(75) Inventor: Dan Persson, Alingsas (SE)

(73) Assignee: Autoliv Development AB, Vargarda (SE)

( * ) Notice: Subject to any disclaimer, the term of this patent is extended or adjusted under 35 U.S.C. 154(b) by 806 days.

(21) Appl. No.: 12/304,199

(22) PCT Filed: Jun. 14, 2006

(86) PCT No.: PCT/SE2006/000700
§ 371 (c)(1),
(2), (4) Date: Dec. 10, 2008

(87) PCT Pub. No.: WO2007/145547
PCT Pub. Date: Dec. 21, 2007

(65) Prior Publication Data
US 2009/0267386 A1    Oct. 29, 2009

(51) Int. Cl.
*B62D 7/22*     (2006.01)
(52) U.S. Cl. .............. 280/784; 296/187.03; 296/187.06; 296/146.6
(58) Field of Classification Search .................. 280/784; 296/188, 189, 187.01, 187.03, 187.06, 146.6
See application file for complete search history.

(56) References Cited

U.S. PATENT DOCUMENTS

| | | | |
|---|---|---|---|
| 4,050,537 A | 9/1977 | Bez | |
| 5,382,051 A * | 1/1995 | Glance | 280/751 |
| 5,727,815 A * | 3/1998 | Smith | 280/784 |
| 5,845,937 A | 12/1998 | Smith | |
| 6,113,178 A * | 9/2000 | Faigle | 296/187.06 |
| 6,334,639 B1 * | 1/2002 | Vives et al. | 293/133 |
| 7,137,472 B2 * | 11/2006 | Aoki | 180/274 |
| 7,416,043 B2 * | 8/2008 | Pipkorn et al. | 180/274 |
| 7,784,817 B2 * | 8/2010 | Choi et al. | 280/728.2 |
| 2002/0175537 A1 | 11/2002 | Cress | |

FOREIGN PATENT DOCUMENTS

DE    19963068 A1    6/2001
WO    WO 01/26952 A1    4/2001

* cited by examiner

*Primary Examiner* — Toan To
(74) *Attorney, Agent, or Firm* — Harness, Dickey & Pierce, P.L.C.

(57) ABSTRACT

A vehicle structure arrangement includes a pressurizable reinforcement element that may be arranged interiorly a beam, such as an A-pillar to reinforce the beam. The reinforcement element may be a tubular element having a flexible wall portion, The tubular element may be adapted to be self-stiffened when in a pressurized active state. In the pressurized state, the material and dimension of the tubular element wall portion are adapted to withstand actual stresses along longitudinal direction of the wall portion. The reinforcement element may be activated by a pre-crash unit.

17 Claims, 2 Drawing Sheets

VEHICLE STRUCTURE ARRANGEMENT PROVIDED WITH PRESSURIZABLE REINFORCEMENT ELEMENT

CROSS-REFERENCE TO RELATED APPLICATIONS

This application is a 371 U.S. National Stage of International Application No. PCT/SE2006/000700, filed Jun. 14, 2006 and published in English as WO 2007/145547 A1 on Dec. 21, 2007. The disclosures of the above application are incorporated herein by reference.

TECHNICAL AREA

The present invention relates to a vehicle structure arrangement comprising a pressurizable reinforcement element provided in connection with a vehicle structure profile to reinforce said profile.

TECHNICAL BACKGROUND

The above mentioned arrangement is previously known. DE 19963068 A1 discloses a gas bag which is being inflated and fills up a vehicle cavity, such as a door cavity, in case of an impact accident, wherein the gas bag follows the internal contour of the cavity.

When designing a vehicle structure a number of contradictory requests have to be considered. The structure should be durable and secure enough to provide good protection for the occupants in case of an accident and at the same time provide a slim design of the vehicle structure having good space efficiency.

In recent years there has been an increased focus on vehicle safety whereby it is desirable to further improve the safety for the vehicle structure.

Finally it is desirable to provide a robust, cost effective and reliable high quality arrangement for a vehicle structure.

SUMMARY OF THE INVENTION

The object of the invention is to provide a vehicle structure arrangement which allows improvements in relation to prior-art arrangement in one or more of the above aspects.

In one aspect of the present invention, a vehicle structure arrangement according to the introduction is further characterised in that the reinforcement element is a tubular element having a flexible wall portion which tubular element is adapted to be self-stiffened when being in a pressurized active state, wherein the material and dimension of the tubular element wall portion are adapted to withstand actual stresses along longitudinal direction of said wall portion, in said pressurized active state.

Thus the tubular element is pressurized in response to a crash signal and/or a predicted crash signal to improve the strength of the vehicle structure profile.

The wall portion of the tubular element is stiffened in such a way that the wall portion can withstand loads in the longitudinal direction of the wall portion. The form of the tubular element with its wall portions may be adapted to a specific crash type, such as when a vehicle turns upside down (roll over). For instance an adapted activation may be performed by selected tubular elements to constitute a reinforcement adapted to the crash type.

By the expression "self-stiffened" is meant that the tubular element is more stiffened and that the wall portion of tubular element in itself may withstand stresses.

By the expression "flexible wall portion" is primary meant that that the wall thickness is adapted to withstand significantly higher stresses in a pressurized state. The wall portion may be of a semi-rigid material which may flex to some extent e.g. for easier mounting purposes.

The vehicle structure profile is preferably a beam, such as a pillar, having an interior space wherein the reinforcement element is arranged at least partly in said interior space of said beam. In such a case the reinforcement element is arranged in a restricted area for up-taking actual stresses and loads. For instance, the beam, may comprise several interior spaces fitted with several reinforcement elements.

The tubular element is preferably self-stiffened without filling up said interior space of said beam, in said pressurized active state. Thus the entire volume of the interior space is preferably not filled up. Preferably, the tubular element do not follow all the contours of the interior space. For instance the non occupied space may be used by other devices, such as one of a cable, an energy absorbing element and an additional reinforcement element.

The wall portion of the tubular element may be arranged to contact an opposite wall portion of said beam. In an active state the tubular portion may have at least one contact surface with the interior surface of the beam as an additional reinforcement.

Preferably, the extension of said tubular element is adapted to the extension of said vehicle structure profile so as to constitute said reinforcement in at least one predetermined direction. For instance, the tubular element may be adapted to said predetermined direction which having at least one of the reinforcements in said pressurized active state; a lengthwise reinforcement, a diagonal reinforcement, a transversal reinforcement and a reinforcement orthogonally the length extension and combinations thereof. Thus, the reinforcement may be adaptive controlled due to the type of crash.

In order to constitute the reinforcement in specific predetermined directions, the vehicle structure profile may have a main centreline along the length extension, wherein said tubular element having at least a transverse extension which is directed transversely said main centreline.

By arranging said transverse extension to contact opposite wall portions of said vehicle structure profile, the contact may act as a support point for additional reinforcement in said active state.

Also, the transverse extension may be at least one protrusion directed transversely a centre portion of said tubular element. In order to perform a lengthwise reinforcement and a transversal reinforcement, the tubular element may be skeleton shaped comprising a number of said protrusions with opposite contact surfaces of the vehicle structure profile.

In order to perform a diagonal reinforcement, the tubular element is zigzag shaped, having wall portions which extends alternatingly each other with opposite contact surfaces of said vehicle structure profile.

The tubular element is preferably arranged between a first end portion and a second end portion of said beam. The end portions may be fastening portions for supporting and reinforcing the vehicle structure profile. For instance the fasting portions may be an upper and lower fastening portions for an essentially vertical pillar.

The tubular element may comprises a reinforcement material layer, such as one of a glass fibre material, thin metal material, carbon fibre material, concatenating polymer material, rowing weave material or combinations thereof. The reinforcement layer may be one of a cord, a sheet, a net or weave material, for instance a metal net or an armoured conduit of polymer material. The reinforcement layer may be a separate layer or may be integrated with the rest of the wall portion material.

The wall portion of said tubular element may comprises at least two layers for enabling different reinforcement properties or providing a pressurizable intermediate space between the layers.

According to an embodiment of the invention the vehicle structure profile is a A-pillar and/or a B-pillar for which pillars reinforcement as well as space efficiency are important aspects. Alternatively other parts of the vehicle may be reinforced, for instance the vehicle structure profile may be a front bumper and/or a rear bumper.

The vehicle structure profile may comprise at least two tubular elements arranged to be independently pressurized. Such an arrangement enables a further adapted reinforcement. The tubular elements may be arranged with one or several pressurizing means. For instance the tubular element may be pressurized in sequence or respectively pressurized with a predetermined time delay. Also the tubular element may have different or complementary reinforcing properties.

The reinforcement element may be adapted to be selectively activated, due to the type of impact.

For instance the vehicle may comprises a pre-crash system in connection with one or several tubular elements. Based on the predicted crash type in the pre-crash system, an adaptively activation may be performed by selected tubular elements for reinforcement in at least one predetermined direction. For instance the selection may be regulated by valves in connection with the pressurisation of the selected elements.

Objects and advantages will be apparent to those skilled in the art form the following detailed description taken in conjunction with the appended claims and drawings.

BRIEF DESCRIPTION OF THE DRAWINGS

The present invention will now be described in more detail with the reference to the accompanying schematic drawings which show preferred embodiments of the invention and in which.

DETAILED DESCRIPTION OF THE INVENTION

Figure 1:
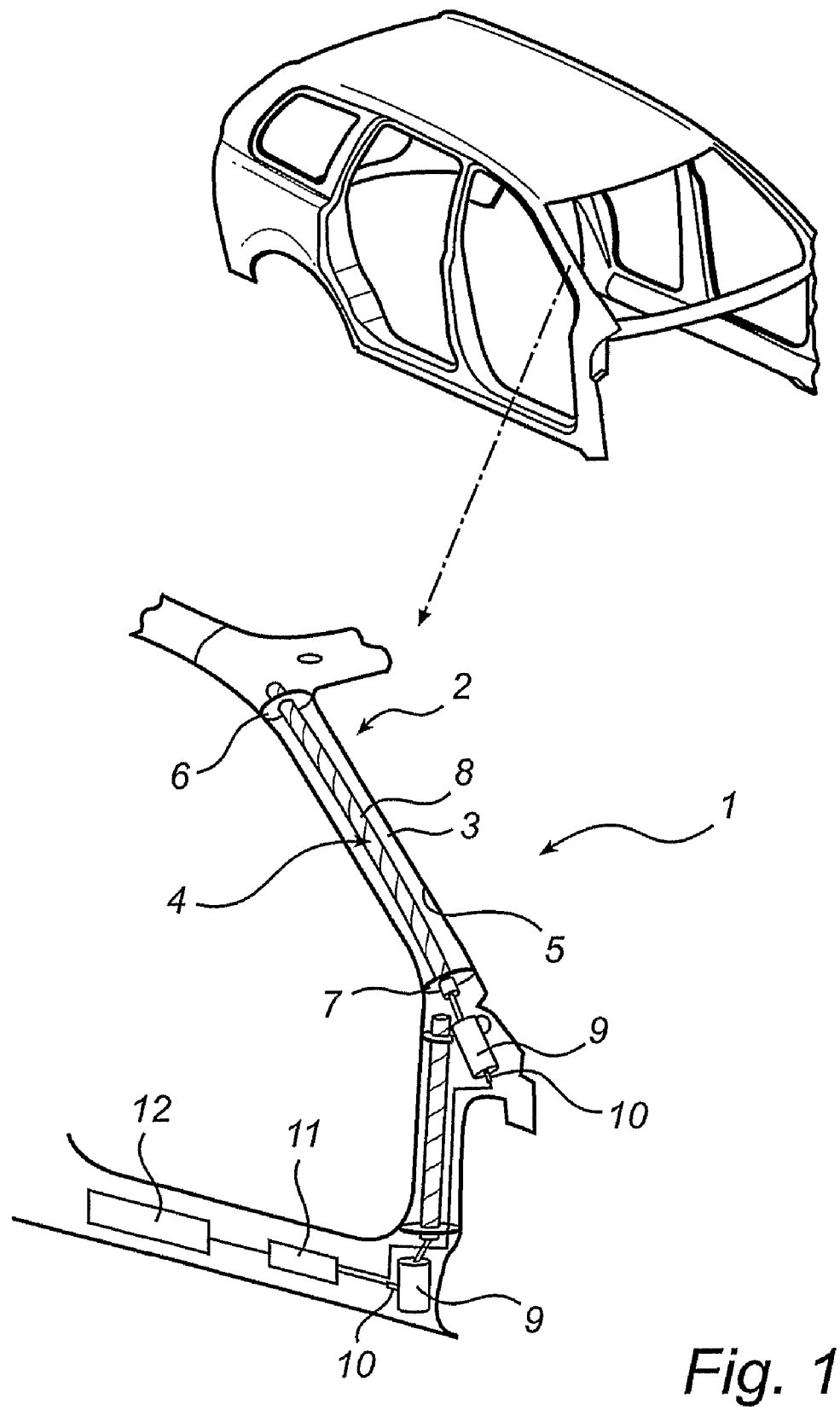
FIG. 1 shows a perspective view, partly in section, of a pillar fitted with a reinforcement element according to a first embodiment of the invention.

FIG. 1 shows a part of a vehicle frame structure 1 having an A-pillar 2. The A-pillar has an interior cavity 3, in this case in the form of an elongated section, adapted to receive at least one inflatable reinforcement element 4 according to a first embodiment of the invention. The cavity is defined by cavity wall portions 5 in which the tubular element is received. The element 4 is preferably a tubular element 4 which is fastened in a first end portion 6 and a second end portion 7 of the cavity 3. However, at least one end of the tubular element 4 may extend outside the cavity 3. Additional tubular elements may be arranged in the vehicle at different locations, as exemplified in FIG. 1.

The tubular element 4 in FIG. 1 is preferably adapted to reinforce the frame structure 1 in the longitudinal direction between the first end portion 6 and second end portion 7. The tubular element 4 in FIG. 1 has an essentially circular cross section having a flexible wall portion 8 in an un-active and un-pressurized state. The wall portion 8 is preferably rigid to such an extent that the element will not be bend and doubled when mounting the element. Preferably, slighter adjustments may be made for easier introduction into the cavity, when mounting the element.

The tubular element 4 is in fluid connection with a gas generator 9 for pressurizing the element in an active state. The gas generation may be achieved in different ways. The gas may be generated from gas chambers filled with compressed gases. The gases may be: inert gases, such as at least one of the gases; Ar, He or N2 or combustible gases such as one of the gases H2, CH4, C2H6 or C3H8; or any mixtures thereof. Alternatively the gas may be generated from pyrotechnic charges. For instance pyrotechnic cords (not shown) may be arranged interiorly the tubular element 4 for pressurization.

Due to the high pressure in the active state, the tubular element preferably comprises a reinforcement material. The pressure is preferably above 5 bar and preferably between 5-100 bar, more preferably between 20-70 bar and most preferably between 30-50 bar.

To ventilate the tubular element from excess of gas and to regulate the gas pressure a ventilation arrangement (not shown) may be arranged in connection with the tubular element. The ventilation arrangement may be a burst disc adapted to burst at a predetermined gas pressure or alternatively a mechanical valve which for instance may be spring biased.

The tubular element may comprise an armoured polymer tube or a metal mantle.

However, the reinforcement material may be of different material, designs and forms, such as one of a cord, sheet, fibre, net, weave material portion or a combination thereof. For instance the tubular element may comprise one of the following reinforcement layers; glass fibre, metal net, thin steel sheet material or metal cord material. Additionally the tubular element may comprise at least two layers for improving reinforcement or self-stiffening properties.

FIG. 1 shows that the gas generator 9 may be fitted with an initiator 10 which is connected to a control unit 11, such as an electrical processing unit (EPU) for activating the pressurization in the tubular element. The control unit 11 may in turn and alternatively instead be connected to a pre-crash system 12. The pre-crash system 12 may comprise a set of sensors arranged at different locations at the vehicle in order to determine which type of crash the vehicle is about to be subjected to. As an example such sensors may be at least one of the following; a distance sensor, a decelerate sensor and a radar device.

Figure 2A:
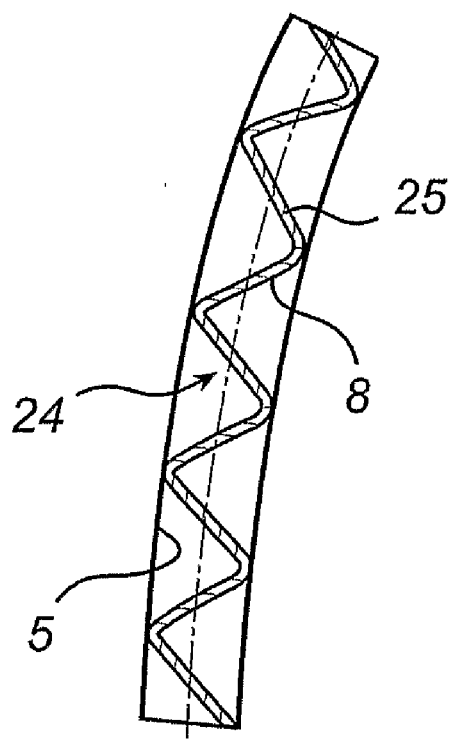
FIG. 2a shows a perspective view of a reinforcement element according to a second embodiment of the invention.

FIG. 2a shows an alternative reinforcement element 24 according to a second embodiment of the invention to achieve an essentially diagonal reinforcement. The tubular element 24 is preferably zigzag shaped but other forms may be used such as an helical shape. The dotted line in FIG. 2a shows a main centre line along the length extension, wherein the tubular element has transverse extensions 25 directed transversely the main centre line. The transverse extensions 25 is preferably slightly bevelled for achieving a smooth contact with the cavity wall 5 and improving the reinforcement characteristics. The transverse extensions 25 withstand stresses in the longitudinal direction of the wall portions 8 which are diverging according to the second embodiment. Thus, the form of the tubular element in relation to the vehicle structure may provide a selected load take-up and a reinforcement in additional directions, such as a combination of a longitudinal and a transversal direction.

Figure 2B:
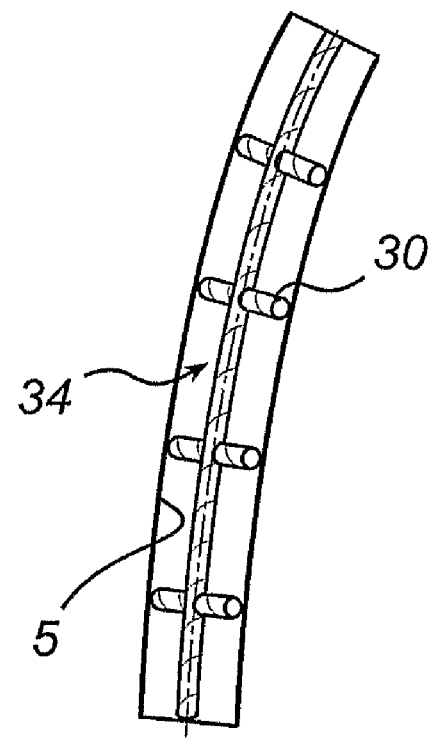
FIG. 2b shows a perspective view of a reinforcement element according to a third embodiment of the invention.

FIG. 2b shows an alternative reinforcement element 34 according to a third embodiment of the invention to achieve a combination of an essentially longitudinal and a transversal reinforcement. The tubular element 34 has transversal extensions in the form of transversal protrusions 30, preferably skeleton shaped. In this case the protrusions 30 is essentially orthogonally arranged to the main centreline. The protrusions 30 is preferably oppositely arranged to contact the cavity wall 5 for improving the reinforcement characteristics. However the protrusions may be arranged differently at the tubular element, such as unevenly distributed along the longitudinal and/or circumferential direction.

With reference to FIG. 1 the function of the arrangement according to the invention will be described in the following.

Upon sensing a crash in the absolute near future by the pre-crash system 12 the control unit 11 may be activated and the initiator 10 can ignites the gas generant material. The gas generator 9 discharges the gas into the tubular element via a gas diffuser (not shown) for pressurization. Due to the reinforcement layer the pressurization may be performed with hardly no significant circumferential expansion. Preferably the tubular element is pressurized without any substantial size expansion. In order to be more space efficient, the volume of the tubular element in said pressurized state is preferably less than 100% of the entire volume. Preferably the volume of the tubular element in said pressurized state is preferably under 90% of the entire cavity volume, more preferably under 75% and most preferably under 50% of the entire cavity volume. However, the number, the form and positioning of tubular element may be selected to provide a desired particular reinforcing performance in a certain application. For instance the tubular element preferably contacting the cavity wall portion without filling up the entire cavity volume. Additionally, as shown in FIG. 1, the vehicle frame structure 1 may be provided with a set of tubular elements which elements may be activated in sequence or activated with a predetermined delay.

It will be appreciated that the above-described embodiments of the invention can be modified and varied by a person skilled in the art without departing from the inventive concept defined in the claims. For instance a in-crash system may be used in addition or alternatively instead of the pre-crash system. The in-crash system is preferably arranged with a sensor system as known in the art. In addition to the already mentioned gas generating devices, other ways are possible of pyrotechnic and non-pyrotechnic solutions with or without premixing chambers. It is also possible to combine different gas generating constructions. Also, the cavity 3 may be provided with at least two reinforcement elements which may have different reinforcing properties. Additionally the reinforcement element may be arranged in different beams and profiles. For instance a profile may be arranged with a tubular element which is held in place at the profile, for instance by transversal bridging elements which at least partly encircles the circumferential wall portion of the tubular elements. Also a front and/or a rear bumper may be provided with at least one reinforcement element according to the invention. For instance, the bumber, seen as a beam, may be arranged with a set of tubular elements. The tubular elements can be activated essentially simultaneously or alternatively a selected set may be activated, for instance in a sequence. The set may be arranged in a honeycomb structure for an efficient stress up-taking ability. Associated beams to the bumper may also be provided with reinforcement elements.

The invention claimed is:

1. A vehicle structure arrangement comprising: a pressurizable reinforcement element provided in connection with a vehicle structure profile to reinforce said profile, the reinforcement element including a tubular element having a flexible wall portion, the tubular element being self-stiffened when in a pressurized active state, the wall portion adapted to withstand actual stresses along a longitudinal direction of said wall portion, in said pressurized active state;
   wherein said vehicle structure profile is a beam having an interior space, the reinforcement element at least partly arranged in said interior space of said beam.

2. The arrangement according to claim 1, wherein said tubular element is self-stiffened without filling up said interior space of said beam, in said pressurized active state.

3. The arrangement according to claim 2, wherein said wall portion of the tubular element is arranged to contact opposite wall portions of said beam.

4. The arrangement according to claim 1, wherein an extension of said tubular element is adapted to an extension of said vehicle structure profile so as to constitute said reinforcement in at least one predetermined direction.

5. The arrangement according to claim 4, wherein said tubular element is adapted to said predetermined direction having at least one of the reinforcements in said pressurized active state: a lengthwise reinforcement, a diagonal reinforcement, a transversal reinforcement and a reinforcement orthogonally the length extension.

6. The arrangement according to claim 1, wherein said tubular element is between a first end portion and a second end portion of said beam.

7. The arrangement according to claim 1, wherein said wall portion of said tubular element includes at least two layers.

8. The arrangement according to claim 1, wherein said vehicle structure profile is a A-pillar and/or a B-pillar.

9. The arrangement according to claim 1, wherein said vehicle structure profile is a bumper.

10. The arrangement according to claim 1, wherein said vehicle structure profile includes at least two tubular elements arranged to be independently pressurized.

11. The arrangement according to claim 1, wherein the reinforcement element is selectively activated in response to a type of impact.

12. A vehicle structure arrangement comprising: a pressurizable reinforcement element provided in connection with a vehicle structure profile to reinforce said profile, the reinforcement element including a tubular element having a flexible wall portion, the tubular element being self-stiffened when in a pressurized active state, the tubular element wall portion adapted to withstand actual stresses along a longitudinal direction of said wall portion, in said pressurized active state;
   wherein said vehicle structure profile has a main centerline along the length extension and said tubular element has at least a transverse extension which is directed transverse to said main centerline.

13. The arrangement according to claim 12, wherein said transverse extension contacts opposite wall portions of said vehicle structure profile.

14. The arrangement according to claim 12, wherein said transverse extension is a protrusion directed transversely to a center portion of said tubular element.

15. The arrangement according to claim 14, wherein said tubular element is skeleton shaped including a number of said protrusions.

16. The arrangement according to claim 12, wherein said tubular element is zigzag shaped, having wall portions which extend alternatingly with opposite contact surfaces of said vehicle structure profile.

17. A vehicle structure arrangement comprising: a pressurizable reinforcement element provided in connection with a vehicle structure profile to reinforce said profile, the reinforcement element including a tubular element having a flexible wall portion, the tubular element being self-stiffened when in a pressurized active state, the tubular element wall portion adapted to withstand actual stresses along a longitudinal direction of said wall portion, in said pressurized active state;
  wherein said tubular element includes a reinforcement material layer selected from a group including glass fiber material, thin metal material, carbon fibre material, concatenating polymer material, rowing weave material and combinations thereof.

* * * * *